Feb. 1, 1966     C. G. KATZENBERGER     3,232,679
ENDLESS TRACTOR TRACK
Filed Feb. 19, 1965

INVENTOR.
CLARENCE G. KATZENBERGER
BY Joseph G. Werner
ATTORNEY

United States Patent Office 3,232,679
Patented Feb. 1, 1966

3,232,679
ENDLESS TRACTOR TRACK
Clarence George Katzenberger, Rte. 1, Middleton, Wis.
Filed Feb. 19, 1965, Ser. No. 433,911
4 Claims. (Cl. 305—13)

This is a continuation-in-part application of my application Serial Number 31,368, filled May 24, 1960, now Patent No. 3,170,531 and entitled "Convertible Tractor."

This invention relates to an endless track designed for use on rubber tire type vehicles to convert such vehicles to endless track type vehicles, and is particularly adapted for use on a tractor of the type disclosed in my above identified application.

An object of my invention is to provide a novel endless track which may be readily mounted on and removed from the vehicles having rubber tires.

Further objects, features and advantages of my invention will be apparent from the following detailed description taken in conjunction with the accompanying drawings wherein preferred embodiments of my invention have been selected for exemplification.

Figure 1:
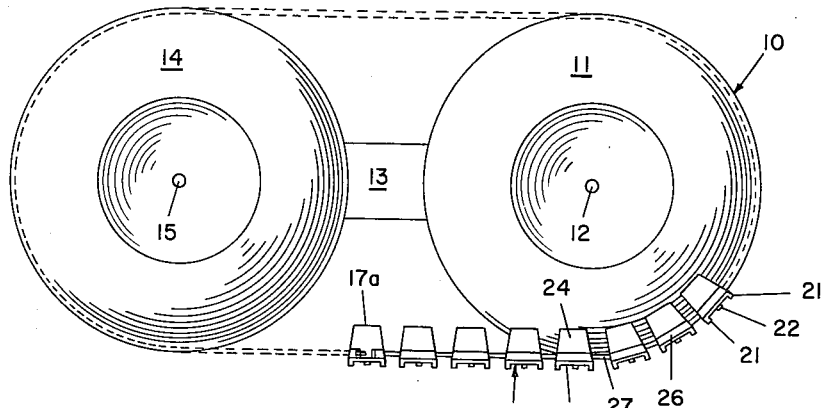
FIG. 1 is a schematic side elevation view of a rubber tire type vehicle with my novel track mounted thereon.
Figure 2:
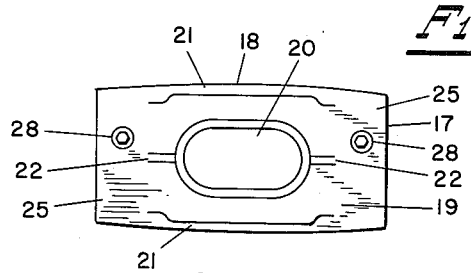
FIG. 2 is an outside view of an endless track cleat.

Referring now more specifically to the drawings, FIG. 1 shows a schematic view of a portion of a vehicle shown generally at 10, having a forward rubber tire 11 rotatably mounted on a forward axle 12 carried in the main frame 13 of the vehicle and having a rear rubber tire 14 rotatably mounted on a rear axle 15 which is also mounted in the main frame.

The vehicle 10 is preferably of the type disclosed in my above-identified application, that is, a vehicle whose wheelbase may be readily lengthened or shortened to facilitate the installation of my endless track, a portion of which is shown generally at 16. However, the length of the track 16 may also be varied to facilitate its installation on vehicles having a fixed wheelbase.

Referring now to FIGS. 2–5, each endless track cleat 17 has a body portion 18 with an outer surface 19 and preferably an aperture 20. Each cleat 17 also has outwardly extending slope ridges 21 and 22, tire guides 24 extending inwardly from the body portion 18 and wings 25 extending laterally from body portion 18. Cable holders 26 with beveled ends 26a are secured to the inner side of wings 25 and the outer side of tire guides 24 by suitable means such as welding. Cable 27 is strung through cable holders 26 and is secured therein by Allen screws 28.

Figure 3:
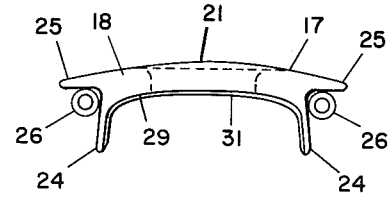
FIG. 3 is a front elevation view of the endless track cleat.
Figure 5:
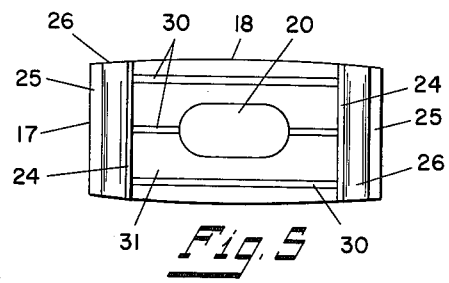
FIG. 5 is an inside view of the endless track cleat.

As best seen in FIG. 5 the inner surface 29 of the cleats 17 may have ridged portions 30 to provide greater friction between the cleats 17 and the tires 11 and 14. The inner surface 29 of cleats 17 may also have a layer of rubber 31 as shown in FIG. 3 laminated thereto to provide still greater friction between the cleats 17 and the tires 11 and 14.

The track cleats 17 are especially made for use over rubber tires. Tire guides 24 retain the cleats in lateral position with respect to the tires 11 and 14 and ridges 30 provide friction between the tires and the cleats substantially to prevent slippage. Aperture 20 provides an area through which mud, clumps of dirt and snow may fall, thereby preventing an accumulation of such materials between the cleat and the tire. Ridges 21 and 22 provide good traction for cleats 17 in relation to the ground surface or snow, and yet provide a relatively small area of contact with the ground or other surface when the tractor is turned. In having such a small area of contact, the disturbance of the earth or other surfaces is minimized upon turning the tractor.

Figure 4:
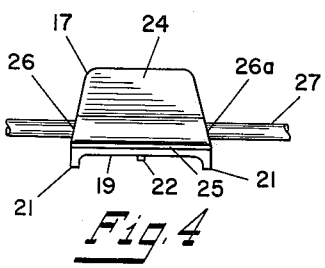
FIG. 4 is a side elevation view of the endless track cleat showing the track cable extending therethrough.

Wings 25 of cleats 17 give a broad spread to the cleats, and at the same time afford protection to the cable holders 26. Cable holders 26 have beveled ends 26a as shown in FIG. 4 to permit adjoining cleats to fit closely when passing over the periphery of the vehicle tires 11 and 14. Cable holders 26 may be secured to wings 25 and tire guides 24 by welding and provide a simple means for threading the cable 27 through them.

Figure 6:
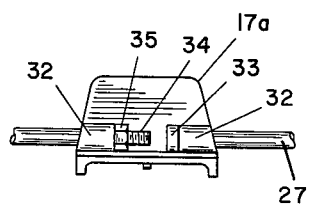
FIG. 6 is a side elevation view of the endless track cleat which secures the ends of the cables.

As best seen in FIG. 6, the ends of cable 27 are held in a connecting cleat 17a which may differ slightly from the rest of the cleats 17. Connecting cleat 17a has a pair of cable holders 32 on each side of the cleat. One end of the cable 27 has a head 33 which is adapted to abut one of the cable holders 32 as shown in FIG. 6. The other end of the cable 27 may have threads 34 which are adapted to receive a nut 35 which is turned thereon to tighten the cable 27 about the tires of the vehicle.

Figure 7:
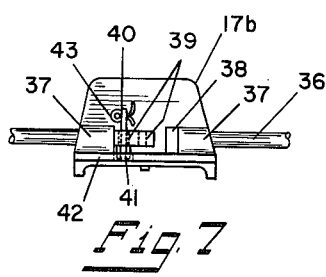
FIG. 7 is a side view of another form of the endless track cleat which holds the ends of a modified cable.

FIG. 7 shows a modified cable 36 and a modified connecting cleat 17b. The cleat 17b has a pair of cable holders 37 on each side of the cleat. The cable 36 has a head 38 thereon which is adapted to abut one of the cable holders 37. The other end of the cable 36 has several adjusting holes 39 therethrough which are shown in phantom in FIG. 7. The holes 39 are adapted to receive a stud 40 which is placed therein through a hole 41 in the wing 42 of cleat 17b. Stud 40 may be maintained in hole 39 in cable 36 by a cotter pin 43 or other suitable means.

It is apparent that cleats may be removed or added as desired and also longer or shorter cables may be used depending on the wheelbase required for a particular job.

To mount the endless track on a vehicle such as 10, the wheelbase is first shortened so that the endless track 16 may be placed over both the rear tire 14 and the front tire 11, respectively. This operation may best be performed by raising one side of the vehicle at a time so that both the tires 11 and 14 on one side will be off the ground to facilitate the placing of the endless track over them. The wheelbase is then lengthened until the track 16 becomes relatively taut as it extends from front tire 11 to rear tire 14.

To mount the endless track on a vehicle having a fixed wheelbase, one side of the vehicle is first raised so that the front and rear tires on one side of the vehicle will be off the ground to facilitate the placing of the track over them. The endless track is then lengthened by retracting nut 35 on the cable 27 until the length of the track is such that it can be easily placed around the front and rear tires of the vehicle. The nut 35 is then tightened on cable 27 until the desired tension in the cable is obtained.

When employing the cable and connecting cleat shown in FIG. 7, the stud 40 is first removed from the cable and the track is placed over the front and rear tires of a vehicle and then stud 40 is replaced in hole 39 and secured therein by cotter pin 43.

It is understood that my invention is not confined to the particular construction and arrangement of parts herein illustrated, but embraces all such modified forms thereof, as may come within the scope of the following claims:

I claim:
1. An endless track for a vehicle having forward and rear tires, comprising:
  (a) a plurality of cleats held in spaced relation on parallel endless cables, each cleat having a unitary body portion comprising a lower ground-engaging surface and an upper tire-engaging surface, said upper and lower surfaces being transversely arcuately curved,
  (b) wing portions extending laterally beyond the opposite sides of said body portion,
  (c) integral cable holders secured to said cleats on the upper side thereof to said wing portions each having a tubular opening through which said cables are extended,
  (d) integral tire guide portions on said cleats extending inwardly from said body adapted to extend over the side edges of said tires for maintaining the cleats in lateral position with respect to said tires,
  (e) said body portion having a centrally disposed aperture therethrough, and
  (f) outwardly extending ridges on said lower surface to provide traction for said track.

2. The structure of claim 1, wherein the upper surface has a layer of rubber.

3. The structure of claim 2, wherein said layer includes ridges for frictional engagement with the tire.

4. The structure of claim 1 wherein said cleats are held in spaced relation on said cables by screws extending through said wing portions and engaging said cables.

References Cited by the Examiner
UNITED STATES PATENTS

| | | | |
|---|---|---|---|
| 1,632,674 | 6/1927 | Pearson | 305—40 |
| 2,179,587 | 11/1939 | Deardorf | 305—40 |
| 2,273,950 | 2/1942 | Galanot et al. | 305—38 X |
| 2,755,146 | 7/1956 | Galanot | 305—13 |
| 3,170,531 | 2/1965 | Katzenberger | 180—9.2 |

BENJAMIN HERSH, *Primary Examiner.*

R. J. JOHNSON, *Assistant Examiner.*